United States Patent [19]

Siepmann

[11] Patent Number: 4,505,454

[45] Date of Patent: Mar. 19, 1985

[54] CHECK VALVE

[75] Inventor: Walter Siepmann, Warstein, Fed. Rep. of Germany

[73] Assignee: Siepmann-Werke GmbH & Co. KG, Warstein, Fed. Rep. of Germany

[21] Appl. No.: 555,691

[22] Filed: Nov. 28, 1983

[30] Foreign Application Priority Data

Nov. 27, 1982 [DE] Fed. Rep. of Germany ....... 3244020

[51] Int. Cl.³ .................................................. B23P 15/00
[52] U.S. Cl. .................................. 251/367; 29/157.1 R; 251/318
[58] Field of Search ................... 251/366, 367, 318; 29/157.1 R

[56] References Cited

U.S. PATENT DOCUMENTS

| 940,239 | 11/1909 | Dikkers | 251/367 |
|---|---|---|---|
| 2,344,041 | 3/1944 | Hoke et al. | 251/366 |
| 2,418,447 | 4/1947 | Arbogast | 29/157.1 R |
| 3,473,785 | 10/1969 | Siepmann | 251/366 |
| 3,756,560 | 9/1973 | Siepmann | 251/367 |
| 3,975,810 | 8/1976 | Siepmann | 29/157.1 R |
| 4,243,204 | 1/1981 | Siepmann | 251/366 |

FOREIGN PATENT DOCUMENTS

| 719338 | 4/1942 | Fed. Rep. of Germany | 251/367 |
|---|---|---|---|
| 904134 | 8/1962 | United Kingdom | 29/157.1 R |

Primary Examiner—A. Michael Chambers
Attorney, Agent, or Firm—Michael J. Striker

[57] ABSTRACT

For providing a minimum dimension and material consumption relative to the respective nominal width and optimal strength and flow conditions, an intermediate housing part of a check valve is composed of two semi-spherical shell halves connected by beam welding along a plane extending transverse to a throughflow axis, the shell halves include hollow connecting pieces and also half rings of a cover flange formed an upper housing opening, the intersecting point of the separating plane with the throughflow axis forms a sphere center of the intermediate housing part, a third part is formed by a pipe bend which has a truncated-cone-shaped chamfered end portion with which it is introduced into a respective inner conical bore from the supply side of the intermediate housing part and welded by an electron beam and which carries at its end opposite to the upper housing opening a valve seat ring, wherein the center of a spherical deflecting portion of the pipe bend at least approximately coincides with the center of the spherical intermediate housing part.

18 Claims, 5 Drawing Figures

CHECK VALVE

BACKGROUND OF THE INVENTION

The present invention relates to a check valve for nominal width over 50 mm.

Check valves of the above mentioned general type are known in the art. In a known check valve, disclosed for example in U.S. Pat. No. 2,344,041, the intermediate housing part is composed of an essentially tubular or hollow-cylindrical parts by a fillet weld joint. One of the short connecting pipes forms an integral component of the cylindrical intermediate part, and the opposite connecting pipe is welded on the intermediate part by a ring-shaped fillet seam, so that the weld seam serves simultaneously for fixing the bottom part of the pipe band inside the housing. In the region of the upper housing opening for the passage of the valve spindle or in the region of the closing body connected therewith and cooperating with the seat ring of the pipe band, a ring pipe surrounding the housing opening is welded by a further fillet seam. The ring pipe serves in turn for connecting with the cover part of the valve.

The advantage of this check valve is that the connecting pipe in direction of the common throughflow axis can be dimensioned relatively shorter than the known check valves, on the one hand, and the utilization of the angular pipe band as a carrier for the seat ring provides for favorable flow conditions during conveyance of the medium from the supply side to the discharge side, on the other hand.

However, this check valve has substantial disadvantage in that its complicated construction requires expensive and not easily automatable manufacture, and that the intermediate housing part assembly from tubular and hollow-cylindrical parts does not provide for favorable relation between material consumption and housing dimensions, on the one hand, and strength, on the other hand. The strength means here both the pressure strength against the inner pressure from the medium and also the deformation resistance of the intermediate housing part against pulling and pressing loads acting from above via the connecting conduit directly onto the intermediate housing part.

It is to be understood that the above mentioned disadvantages increase with increase of the nominal width, for which the check valve must be designed.

For providing favorable relation between material consumption, space utilization and strength, it is generally known in armatures to form the intermediate housing part with a hollow circle shape and composed of two identical half shells with integrated connecting pipes, which are connected by welding along a central plane which is normal to the throughflow axis. This is disclosed, for example, in the DE-AS No. 2,725,799. It is also known to use non-spherical intermediate housing parts for armatures which are assembled of drop-forged parts, as disclosed for example in DE-PS No. 912,649 or DE-Gm No. 1,706,081

In all these cases, there is however an intermediate housing part for a check slider which, because of its fully symmetrical interior construction, is rather suitable as an intermediate housing part for a check valve with its functionally required asymmetrical inner construction.

SUMMARY OF THE INVENTION

Accordingly, it is an object of the present invention to provide a check valve with an intermediate housing part which is suitable for nominal widths above 50 mm, substantially up to 250 mm, provides relative to the respective nominal width minimum dimensions and respectively low material consumption and at the same time optimal strength properties and flow conditions for conveyance of the medium from the supply side to the discharge side, and which at the same time is designed so as to be automatically manufactured in a relatively simple manner.

In keeping with these objects and with others which will become apparent hereinafter, one feature of the present invention resides, briefly stated, in that the intermediate housing part is formed of two identical one-piece semispherical shell halves connected by beam welding and include outer hollow forged connecting pipes and half rings of a cover flange which forms an upper housing opening, so that the separation plane or the beam weld seam connecting the shell halves with one another coincides with a vertical plane which lies in the spindle axis extending normal to the throughflow axis, wherein the intersecting point of this plane with the throughflow axis forms a sear center of the hollow intermediate housing part; a pipe bend which forms a third part of the intermediate housing part has an end portion surrounding at the outer periphery its bottom part and provided with a truncated cone-shaped chamfer with which the pipe bend is introduced axially into a respective conical bore and welded through the supply connecting pipe from outside by an electron beam extending conically at a respective cone angle $\alpha$; and the pipe bend is arranged and formed so that the center of its hollow spherical deflecting region approximately coincides with the center of the hollow spherical intermediate housing part.

Since the intermediate housing part is assembled of two identical drop-forged one-piece hollow spherical shell halves with the aid of only one continuous beam weld seam and the geometrical center of the hollow spherical intermediate housing part coincides with the intersecting point between the separation plane and the throughflow axis, the manufacture is simple and can be carried out easily automatically. The complete spherical symmetry simultaneously provides the situation in which the high natural strength of the spherical shape in relation to the material consumption is utilized favorably, and it provides additionally for a possibility to have minimum dimensions when the available hollow spherical inner chamber is used for the further elements described hereinabove.

The complete spherical symmetry of the inner chamber makes possible, in connection with the angular pipe bend carrying the seat ring, obtaining of optimal flow condition as the discharge side of the seat ring, since the medium over the substantial part of the seat ring periphery is deflected by the spherical contour favorable for the flow conditions into the discharge pipe, so that undesirable whirling and disturbing turbulence are practically avoided.

These favorable flow conditions are also provided since the center of the hollow spherical deflecting portion of the pipe bend coincides with the center of the hollow spherical intermediate housing part.

The welding of the truncated-cone-shaped end portion of the cylindrical connecting region of the pipe bend in a respective conical bore with the aid of the electron beam introduced from the supply pipe and extending conically provides for a possibility of practically automated manufacture.

Experiments have shown that, when the check valve is designed in accordance with the features of the present invention for the nominal width of 100 mm, the spherical intermediate housing part has an outer diameter of only 175 mm, in contrast to the diameter 195 mm required in known check valves. The material consumption is also reduced in respective ratio.

In accordance with a further advantageous feature of the present invention, the cover flange formed of two forged ring halves has the form of a ring cap or top with a reinforced cross section seated directly on the outer spherical contour of the intermediate housing part. This not only considerably reduces the height of the intermediate housing part, but also there is a substantial further advantage in that the intermediate housing part is reinforced in the region of its housing opening. The thickness of the cover flange can be dimensioned such that the upper plane of the cover flange is tangent to the imaginary course of the outer spherical contour of the intermediate housing part.

For providing a possibility to extend the beam weld seam connecting the shell halves in the separation plane also to the cover flange, the ends of the ring halves in their region extending beyond the wall thickness of the intermediate housing part are spaced from the separation plane so that between the ends of the ring halves a radially open unwelded radial gap is formed. This gap can have a width of substantially 3 mm.

It has been determined that it is advantageous when a second conical bore is formed near the first conical bore for receiving the truncated-cone-shaped end of the pipe bend, which second bore extends from the first bore toward the free end of the supply pipe. With this second bore, deflection of the conically extending electron beam is avoided, and therefore an unobjectionable welding is provided.

It is advantageous when the electron beam is supplied under a cone angle of approximately 40°.

The short connecting pipes forming the components of the intermediate housing part make possible, in connection with the spherical shape of the housing, to provide in direction of the throughflow axis such a length that the standard length of the armature provided for the respective nominal width is exhausted when the conventional welded pipes or available standard flanges are connected with the connecting pipes.

For providing for the respective nominal width minimum sear radii, it is advantageous in accordance with still a further feature of the present invention when the truncated-cone-shaped welding end of the pipe bend is dimensioned relative to its circumference such, and introduced into the conical bore of the intermediate housing part such that the plane of the maximum diameter of the truncated-cone-shaped chamfer contacts the outer spherical contour of the intermediate housing part in a contact point, and the housing opening formed in the cover flange is at least approximately tangent to it in this contact point.

Other features of the present invention are also provided for the same purpose of optimal utilization of the interior of the housing, and they can be used alone or in combination with one another.

The pipe bend is advantageously formed of one-piece drop-flanged blank, whereas the seat ring is armored in a known manner, or in other words reinforced during a build-up welding.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
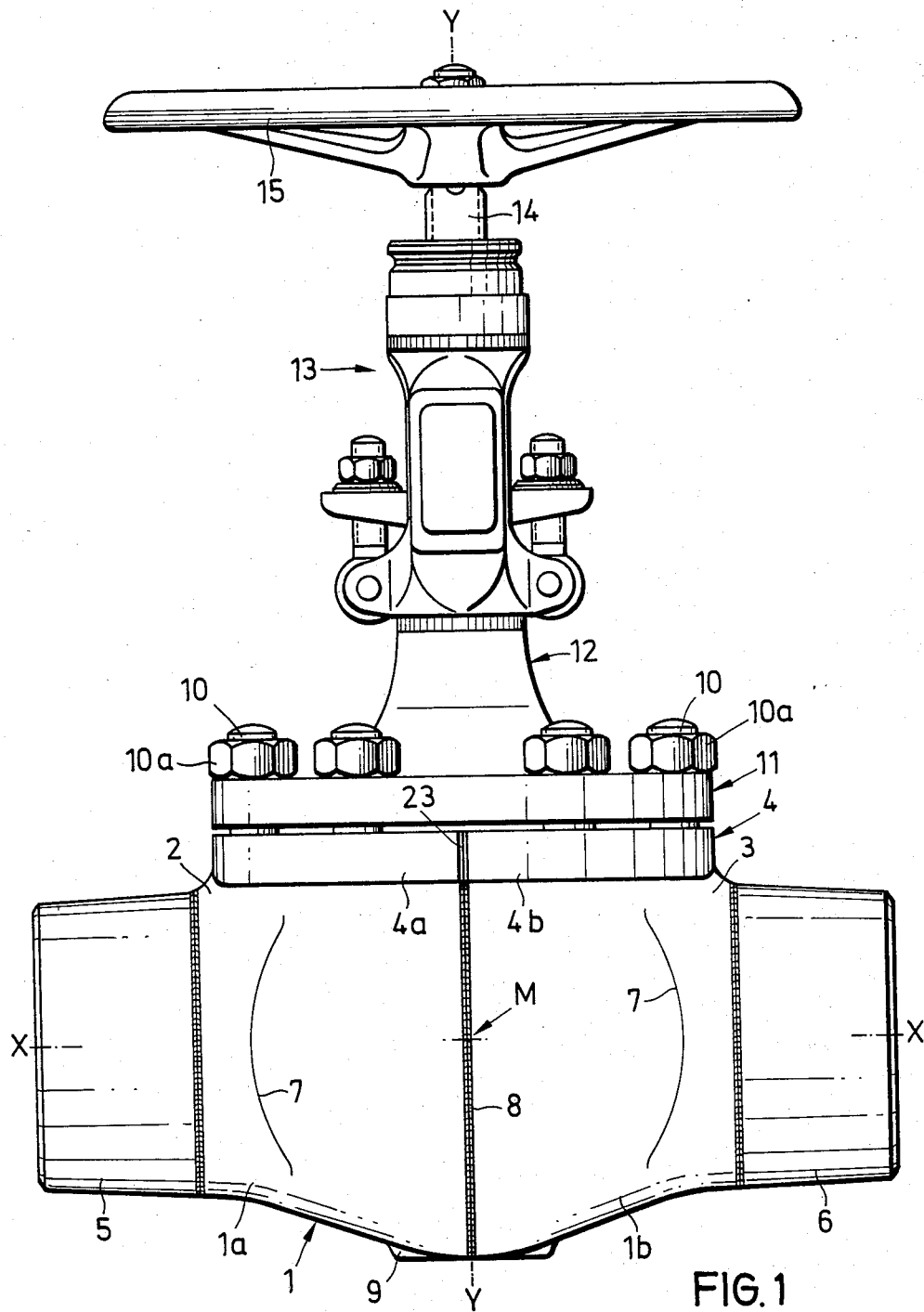
FIG. 1 is a side view showing an intermediate housing part of a check valve in accordance with the present invention.

A check valve in accordance with the present invention has a housing with an intermediate housing part which is identified with reference numeral 1. The housing also has two connecting pipes identified with reference numerals 2 and 3. The connecting pipes 2 and 3 are short and integral with the intermediate housing part 1 and lie on the common throughflow axis X—X. The housing further has a cover flange identified with reference numeral 4 and surrounding the upper housing opening.

Reference numerals 5 and 6 identify weld-on flanges which are welded at both ends of the connecting pipes 2 and 3, as shown in FIG. 1. These weld-on flanges can be replaced by respective standard flanges 5a and 6a illustrated in FIGS. 2-5.

The axis of a spindle is identified in FIG. 1 as Y—Y. The spindle axis Y—Y intersects the throughflow axis X—X normal thereto, and the point of intersection forms a geometrical center of the central housing part 1 which has a hollow spherical shape. The outer contour of the intermediate housing part 1 is identified in FIG. 1 with reference numeral 7.

The intermediate housing part 1 has two semispherical shell halves 1a and 1b which are identical relative to a separation plane 8 and formed as a one-piece drop-forged members. The shell halves 1a and 1b are connected with one another by a continuous beam weld seam. Both semispherical shell halves 1a and 1b of this intermediate housing part 1 have, in addition to the hollow forged connecting pipes 2 and 3, also semicircular halves 4a and 4b of the cover flange 4. Further, both halves have in the bottom region of the housing a central pin-shaped and outwardly extending projection 9 of a circular cross section.

The separation plane 8, in which both shell halves 1a and 1b of the intermediate housing part are connected with one another by the beam weld seam, coincide with a vertical plane which lies in the spindle axis Y—Y and intersects transversely the throughflow axis X—X. The intersection point of this vertical plane with the throughflow axis X—X forms together with the throughflow axis X—X a sear center M of the intermediate housing part 1, as can be particularly seen from the sectional views of FIGS. 2–5.

As can be seen from FIG. 1, the cover flange 4 serves for receiving mounting screws 10 for connecting with a flange 11 of an upper closing hood 12. The respective nuts are identified with reference numerals 10a.

A bracket-shaped housing top 13 is connected with the upper closing hood 12 and serves for guiding and sealing a valve spindle 14. The valve spindle 14 is actuated with the aid of a handle 15. The spindle 14 has a lower end provided in a known manner with a not shown closing body which cooperates with a seat ring 16 of the valve for opening and closing of the latter.

Figure 2:
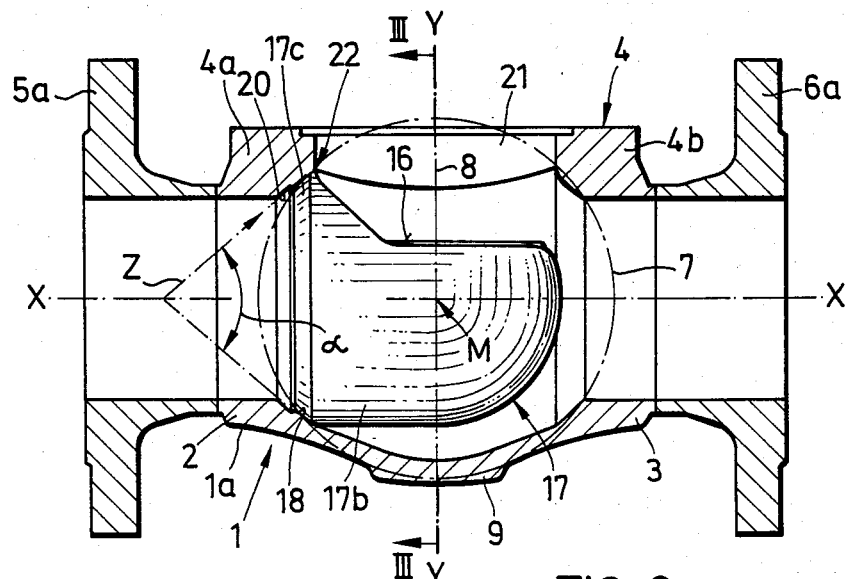
FIG. 2 is a view showing a longitudinal section of an intermediate housing part of FIG. 1 in accordance with an alternative form, with flange pipe instead of weld-on pipe.
Figure 3:
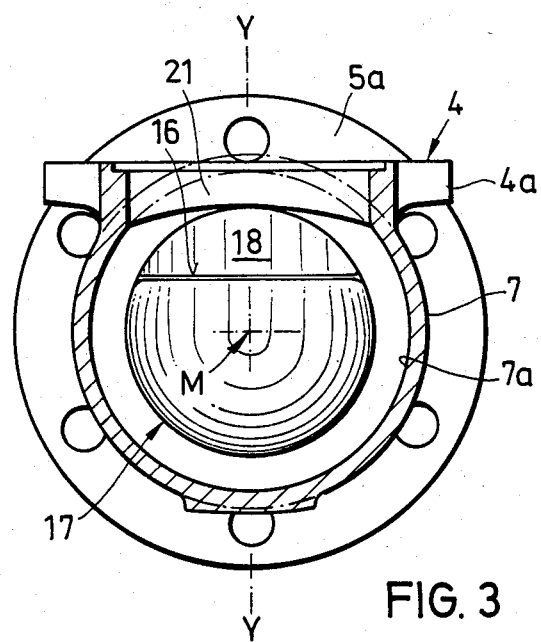
FIG. 3 is a view showing a section of the intermediate housing part taken along the line III—III in FIG. 2.

FIGS. 2–3 show the construction and arrangement of the annular pipe bends 17 which form a third part of the intermediate housing part 1.

Figure 5:
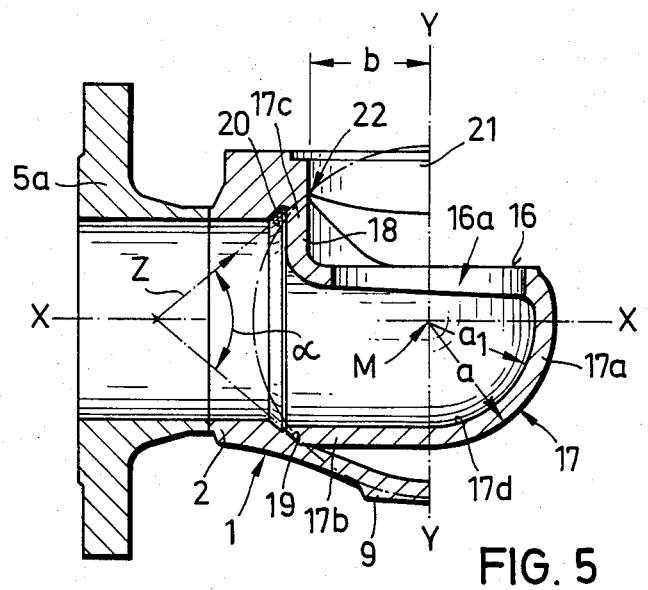
FIG. 5 is a view showing a longitudinal section of the housing body of FIG. 2 with a longitudinal section of a pipe bend.

As can particularly be seen from FIGS. 2 and 5, the pipe bend 17 has a hollow spherical deflecting region 17a with a sphere center coinciding with the sphere center M of the hollow spherical intermediate housing part 1. A substantially cylindrical longitudinal portion 17b extends from the hollow spherical deflecting region 17a toward the supply connecting pipe 2. The longitudinal portion 17b coaxially surrounds the throughflow axis X—X and has at its end, particularly at its weld end surrounding a bottom part 18, a chamfer 17c in form of a truncated cone. With the aid of the chamfer 17c it is inserted into a respective cone-shaped bore 19 inside the housing and welded through the supply connecting pipe 2 from outside by an electron beam which moves conically under a respective cone angle α of 40°.

Figure 4:
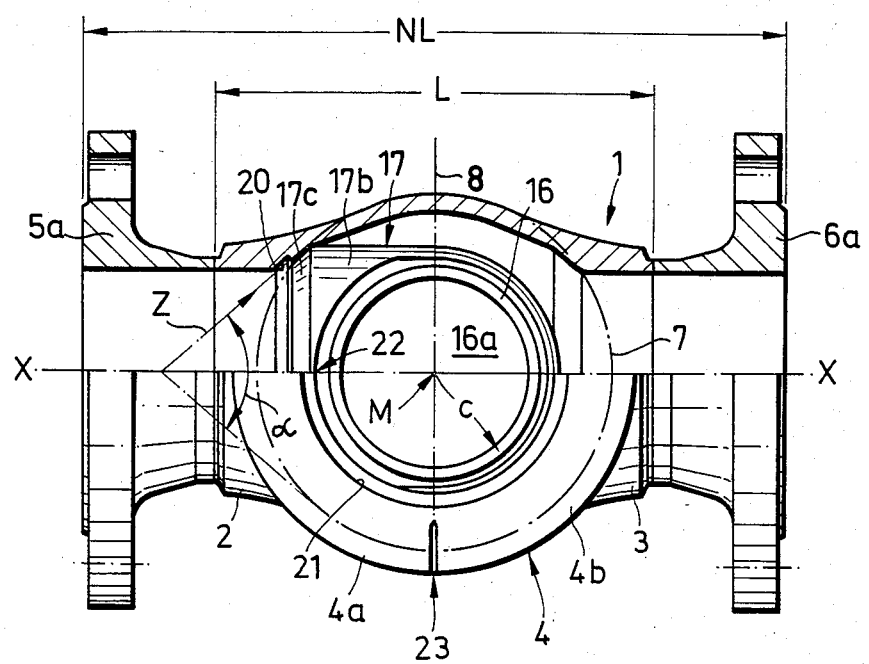
FIG. 4 is a view showing a housing body of FIGS. 2 and 3 in a plan view on a cover flange, partially sectioned.

As can be further seen from FIGS. 2, 4 and 5, a second similar conical bore 20 is connected with the bore 19 which receives the chamfer 17c of the pipe bend 17. More particularly, the bore 20 extends toward the free end of the supply connecting pipe 2 and is offset in a stepped manner outwardly relative to the latter. The bore 20 serves for introducing the electron beam Z into the seam inclined at the same conical angle of 40° between the truncated-cone-shaped chamfer 17c of the pipe bend 17 and the conical bore 19, while avoiding respective deflections.

The pipe bend 17 is produced from a one-piece dropforged blank, and the seat ring 16 is armored in a known manner by direct building-up welding. Reference numeral 16a identifies an opening in the seat ring shown in FIGS. 4 and 5.

For providing with optimal flow conditions for conveying the medium from the supply side to the discharge side, minimum radii for the intermediate housing part, the truncated-cone-shaped weld-on end 17c of the pipe bend is dimensioned in such a manner, and corresponds to the conical bore 19 in the intermediate part in such a manner, that the plane of the maximum diameter of the truncated-cone-shaped chamfer 17c contacts the outer circle contour of the intermediate housing part 1, and a housing opening 21 surrounded by the cover flange 4 is approximately tangent at this contact point 22.

As can particularly be seen from FIGS. 2 and 5, the extension of a cylinder corresponding to the inner diameter of the housing opening 21 intersects the pipe bend for formation of the seat ring 16 in the upper massive region of its cylindrical longitudinal portion 7b cylindrically. This cylindrical depression extends to the plane of the seat ring 16. The plane of the seat ring 16 lies at the location where the above mentioned cylinder corresponding to the inner opening 16a of the seat ring 16 intersects the conical inner contour 17d of the pipe bend 13.

The cylindrical longitudinal portion 17b connected witth the truncated-cone-shaped chamfer 17c of the pipe bend 17 has an outer diameter which substantially corresponds to the diameter of the housing opening 21 enclosed by the cover flange 4. Simultaneously, the outer radius a of the spherical deflecting region 17a of the pipe bend 17 is dimensioned so great that it at least approaches the radius b of the housing opening 21. The inner radius a1 of the spherical deflecting region 17a of the pipe bend is greater than the radius c of the opening 16a of the seat ring 16. The wall thickness of the pipe bend thereby corresponds substantially to the difference between the outer radius a of its spherical deflecting region and the radius c of the opening 16a of the seat ring 16.

FIGS. 2, 3 and 5 also show that the forged-on cover flange 4 which surrounds the housing opening 21 has the shape of a ring projection reinforced in its cross section and directly seated on the outer spherical contour 7 of the intermediate housing part 1. The inner spherical contour is identified in FIG. 3 with reference numeral 7a. The wall thickness of the hollow spherical intermediate housing part 1 corresponds with the radii difference between the outer and the inner contours 7 and 7a.

It can be seen from FIG. 2 that the cover flange 4 is dimensioned so thick that its upper plane is approximately tangent to the imaginary course of the outer spherical contour 7.

Finally, it can be seen from FIGS. 1 and 4 that the forged-on ring halves 4a and 4b of the cover flange 4 are so formed in their ring region extending outwardly beyond the wall thickness of the intermediate housing part 1 that relative to the separating plane 8 they are offset by a value of approximately 1.5 mm. Therefore an unwelded outwardly open radial gap 23 remains between the opposite ends of the ring halves 4a and 4b in the circumferential direction relative to the separation plane 8. As seen in the circumferential direction, the gap has a width of approximately 3 mm. It serves for preventing deflection or other undesirable affection of the electron beam by the ends of the flange ring halves during welding of the housing halves together, and also for formation of a uniform welding connection over the entire remaining peripheral region of the intermediate housing part.

FIG. 4 also shows that the intermediate housing part 1 including the short connecting pipes 2 and 3 has a length A which is shorter by the length of the standard flanges 5a and 6a than the standard length NL of the armature corresponding to the respective nominal width. The same is true for the case when, instead of the connecting flanges 5a and 6a, weld-on pipes 5 and 6 are connected with the connecting pipes, particularly by welding.

It will be understood that each of the elements described above, or two or more together, may also find a useful application in other types of constructions differing from the types described above.

While the invention has been illustrated and described as embodied in a check valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a check valve for nominal widths over 50 mm having a composite intermediate housing part with a throughflow axis and short supply and discharge connecting pipes lying on said throughflow axis, a cover flange defining a housing opening and arranged on said intermediate housing part concentrically to a valve spindle axis which is normal to said throughflow axis for mounting a valve cover, and an angular pipe bend located at said intermediate housing part and carrying a seat ring extending above and parallel to said throughflow axis and having a spherical deflecting portion and a cylindrical portion connected with said spherical portion and concentrically surrounding said throughflow axis, wherein the longitudinal portion has a bottom for mounting said bend in a transition region between said supply connecting pipe and the interior of said intermediate housing part and having an opening for passage of a medium, the improvement in that said intermediate housing part is assembled from two identical, substantially semispherical one-piece shell halves having a separation plane and beam welded in said separation plane, said cover flange being ring-shaped and including two half rings which together with said connecting pipes are parts of said shell halves so that the separation plane in which said shell halves are welded coincides with a vertical plane lying in the spindle axie and intersecting said throughflow axis, wherein the point of intersection said plane with said throughflow axis forms a center of said spherical intermediate housing parts, said intermediate housing part has a conical bore, said pipe bend has an end portion which surrounds said bottom and is provided at its outer periphery with a truncated-cone-shaped chamfer with which it is axially inserted in said conical bore and welded through said supply connecting pipe from outside with the aid of an electron beam extending conically under a respective cone angle α, and said pipe bend is arranged and formed such that its spherical deflection portion has a center which is at least close to said center of said spherical intermediate housing part.

2. A check valve as defined in claim 1, wherein said intermediate housing part has an outer spherical contour, said cover flange formed of said ring halves having the shape of a ring top with a reinforced cross section and being seated directly on said outer spherical contour of said intermediate housing part.

3. A check valve as defined in claim 2, wherein said cover flange has an upper plane which is at least approximately tangent to an imaginary extension of said outer spherical contour of said intermediate housing part.

4. A check valve as defined in claim 2, wherein each of said ring halves of said cover flange has a region extending outwardly beyond the wall thickness of said intermediate housing part and is offset from said separating plane so that in the circumferential direction of said cover member an unwelded and outwardly open radial gap remains between said ring parts.

5. A check valve as defined in claim 4, wherein said offset is equal to substantially at least 1.0–1.5 mm.

6. A check valve as defined in claim 4, wherein said intermediate housing part has a further outwardly stepped conical bore connected with said first-mentioned conical bore for receiving said truncated-cone-shaped chamfer of said pipe bend, said second conical bore being spaced from said first-mentioned conical bore in direction towards said supply connecting pipe.

7. A check valve as defined in claim 6, wherein said first-mentioned conical bore decreases towards said supply connecting pipe and has for a beam welding of said truncated-cone-shaped chamfer of the pipe bend a cone angle α between 38° and 45°.

8. A check valve as defined in claim 7, wherein said cone angle is equal to 40°.

9. A check valve as defined in claim 1; and further comprising two additional parts arranged at both sides of said connecting pipe as considered in direction of said throughflow axis and having a predetermined length in said direction, said intermediate housing part together with said connecting pipes having in direction of said throughflow axis a length which is shorter by the length of both said additional parts than a standard length of the armature provided for the respective nominal width.

10. A check valve as defined in claim 9, wherein said additional parts are formed as pipes welded on said connecting pipes.

11. A check valve as defined in claim 9, wherein said additional parts are formed as standard flanges.

12. A check valve as defined in claim 1, wherein said intermediate housing part has an outer spherical contour, said truncated-cone-shaped chamfer of said pipe bend being so dimensioned and inserted in said conical bore of said intermediate housing part that the plane of the maximum diameter of said truncated-cone-shaped chamfer contacts said outer spherical contour of said intermediate housing part in a contact point, and said housing opening formed in said cover flange is at least approximately tangent to said plane in said contact point.

13. A check valve as defined in claim 1, wherein said housing opening in said cover flange has a cylindrical extension which cylindrically intersects said pipe bend for forming a seat ring with a seat ring opening, said pipe bend having a spherical inner contour, and the plane of said seat ring lies at the location where a cylinder corresponding to said seat ring opening intersects said conical inner contour of said pipe bend.

14. A check valve as defined in claim 1, wherein said housing opening formed in said cover flange has a predetermined diameter, said cylindrical longitudinal portion of said pipe bend having an outer diameter which at least approximately equals said diameter of said housing opening.

15. A check valve as defined in claim 1, wherein said housing opening formed in said cover flange has a predetermined radius, said spherical deflecting portion of said pipe bend having an outer diameter which is at least approximately equal to said radius of said housing opening.

16. A check valve as defined in claim 13, wherein said seat ring opening has a predetermined radius, said spherical deflecting region of said pipe bend having an inner radius which is greater than said radius of said seat ring opening.

17. A check valve as defined in claim 13, wherein said spherical deflecting portion of said pipe bend has a predetermined outer radius, said seat ring opening having a predetermined radius, and said pipe bend having a wall thickness which is substantially equal to the difference between said outer radius of said spherical deflecting portion of said radius of said seat ring opening.

18. A check valve as defined in claim 13, wherein said pipe bend carries said seat ring which is armored by building-up weld and is made as a member formed by forgoing of a one-piece blank.

* * * * *